US008259008B2

(12) United States Patent
Farmer et al.

(10) Patent No.: US 8,259,008 B2
(45) Date of Patent: Sep. 4, 2012

(54) DGNSS CORRECTION FOR POSITIONING (75) Inventors: Dominic Gerard Farmer, Los Gatos, CA (US); Ie-Hong Lin, Fremont, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 12/619,153

(22) Filed: Nov. 16, 2009

(65) Prior Publication Data
US 2010/0149026 A1 Jun. 17, 2010

Related U.S. Application Data (60) Provisional application No. 61/115,471, filed on Nov. 17, 2008.

(51) Int. Cl.
*G01S 19/41* (2010.01)
(52) U.S. Cl. .................................. 342/357.24
(58) Field of Classification Search .............. 342/357.24
See application file for complete search history.

(56) References Cited

U.S. PATENT DOCUMENTS

| 5,990,825 | A * | 11/1999 | Ito ............................ 342/357.31 |
| 6,067,484 | A * | 5/2000 | Rowson et al. ................. 701/16 |
| 6,429,808 | B1 | 8/2002 | King et al. |
| 2003/0011511 | A1 * | 1/2003 | King et al. ............... 342/357.02 |
| 2008/0007452 | A1 * | 1/2008 | Damidaux et al. ....... 342/357.01 |

OTHER PUBLICATIONS

RTCM 10402.3 Recommended Standards for Differential GNSS (Global Navigation Satellite Systems Service) Version 2.3, RTCM Special Committee No. 104, Aug. 20, 2001.

RTCM 10402.3 Recommended Standards for Differential GNSS (Global Navigation Satellite Systems Service) Version 3, with Amendment 1 and with Amendment 2 and with Amendment 3, RTCM Special Committee No. 104, Jun. 5, 2009.
3GPP: "3rd Generation Partnership Project;Technical Specification Group Radio Access Network;Evolved Universal Terrestrial Radio Access (E-UTRA);LTE Positioning Protocol (LPP)(Release 9)" Nov. 1, 2009, 3GPP Draft; R2-097450, 3RD Generation Partnership Project (3GPP), Mobile Competence Centre 650, Route Des Luci0les ; F-06921 Sophia-Antipolis Cedex ; France , XP050391549 [retrieved on Nov. 12, 2009] pp. 11-13 pp. 42-46 pp. 57-76.
International Search Report & Written Opinion—PCT/US2009/064700, International Search Authority—European Patent Office—Feb. 18, 2010.

(Continued)

*Primary Examiner* — Harry Liu
(74) *Attorney, Agent, or Firm* — Jimmy Cheng; Arnold J. Gum (57) ABSTRACT

Techniques for supporting positioning with differential corrections are described. In an aspect, differential correction for a satellite may include (i) a user differential range error (UDRE) indicating an uncertainty in a pseudo-range correction for the satellite, (ii) a UDRE growth rate, which may be a scaling factor for the UDRE, and (iii) a time of validity for UDRE growth rate, which may be a time unit used to apply the scaling factor. In one design, a terminal may send a request message to ask for differential correction information and may receive a response message. The terminal may obtain differential correction (e.g., a UDRE, a UDRE growth rate, and a time of validity for UDRE growth rate) for each of at least one satellite from the response message. The terminal may derive a location estimate for itself based on the differential correction for each satellite.

28 Claims, 5 Drawing Sheets

OTHER PUBLICATIONS

Qualcomm Europe: "Addition of DGNSS Validity Period" Nov. 9, 2009, 3GPP Draft; 25331_CRXXXX_(REL-9)_R2-097089, 3RD Generation Partnership Project (3GPP), Mobile Competence Centre ; 650, Route Des Lucioles ; F-06921 Sophia-Antipolis Cedex ; France, XP050390837 [retrieved on Nov. 6, 2009] the whole document.

* cited by examiner

DGNSS CORRECTION FOR POSITIONING

CLAIM OF PRIORITY UNDER 35 U.S.C. §119

The present Application for Patent claims priority to Provisional U.S. application Ser. No. 61/115,471, entitled "DGNSS Correction," filed Nov. 17, 2008, assigned to the assignee hereof, and expressly incorporated herein by reference.

BACKGROUND

I. Field

The present disclosure relates generally to communication, and more specifically to techniques for supporting positioning.

II. Background

It is often desirable, and sometimes necessary, to know the location of a terminal, e.g., a cellular phone. The terms "location" and "position" are synonymous and are used interchangeably herein. For example, a location services (LCS) client may desire to know the location of the terminal and may communicate with a location center in order to request the location of the terminal The location center and the terminal may then exchange messages, as necessary, to obtain a location estimate for the terminal. The location center may then return the location estimate to the LCS client.

The location of the terminal may be estimated based on pseudo-ranges for a sufficient number of satellites in a global navigation satellite system (GNSS) and the known locations of the satellites. The pseudo-ranges for the satellites may be determined by the terminal based on signals transmitted by the satellites. The pseudo-ranges may have errors due to various sources such as (i) propagation delays of the satellite signals through the ionosphere and troposphere, (ii) errors in ephemeris data describing the locations and velocities of the satellites, (iii) clock drift on the satellites, and/or (iv) pseudo-random errors deliberately introduced in the satellite signals via a process referred to as selective availability (SA). It may be desirable to obtain a reliable location estimate for the terminal in light of the errors in the pseudo-ranges.

SUMMARY

Techniques for supporting positioning with differential corrections to provide reliable location estimates for terminals are described herein. In an aspect, differential correction for a satellite in a GNSS may include a user differential range error (UDRE) as well as a UDRE growth rate and a time of validity for UDRE growth rate to help the terminals better utilize the differential correction. The UDRE may be an estimate of an uncertainty in a pseudo-range correction for the satellite. The UDRE growth rate may be a scaling factor for the UDRE. The time of validity for UDRE growth rate may be a time unit used to apply the scaling factor.

In one design, a terminal may send a request message to ask for differential correction information and may receive a response message with the differential correction information. The terminal may obtain a UDRE, a UDRE growth rate, and a time of validity for UDRE growth rate for each of at least one satellite from the response message. The terminal may derive a location estimate for itself based on the UDRE, the UDRE growth rate, and the time of validity for UDRE growth rate for each satellite. In one design, the terminal may derive a corrected UDRE for each satellite based on the UDRE, the UDRE growth rate, and the time of validity for UDRE growth rate for that satellite. The terminal may then derive the location estimate based on the corrected UDRE (instead of the original UDRE) for each satellite.

Various aspects and features of the disclosure are described in further detail below.

DETAILED DESCRIPTION

Figure 1:
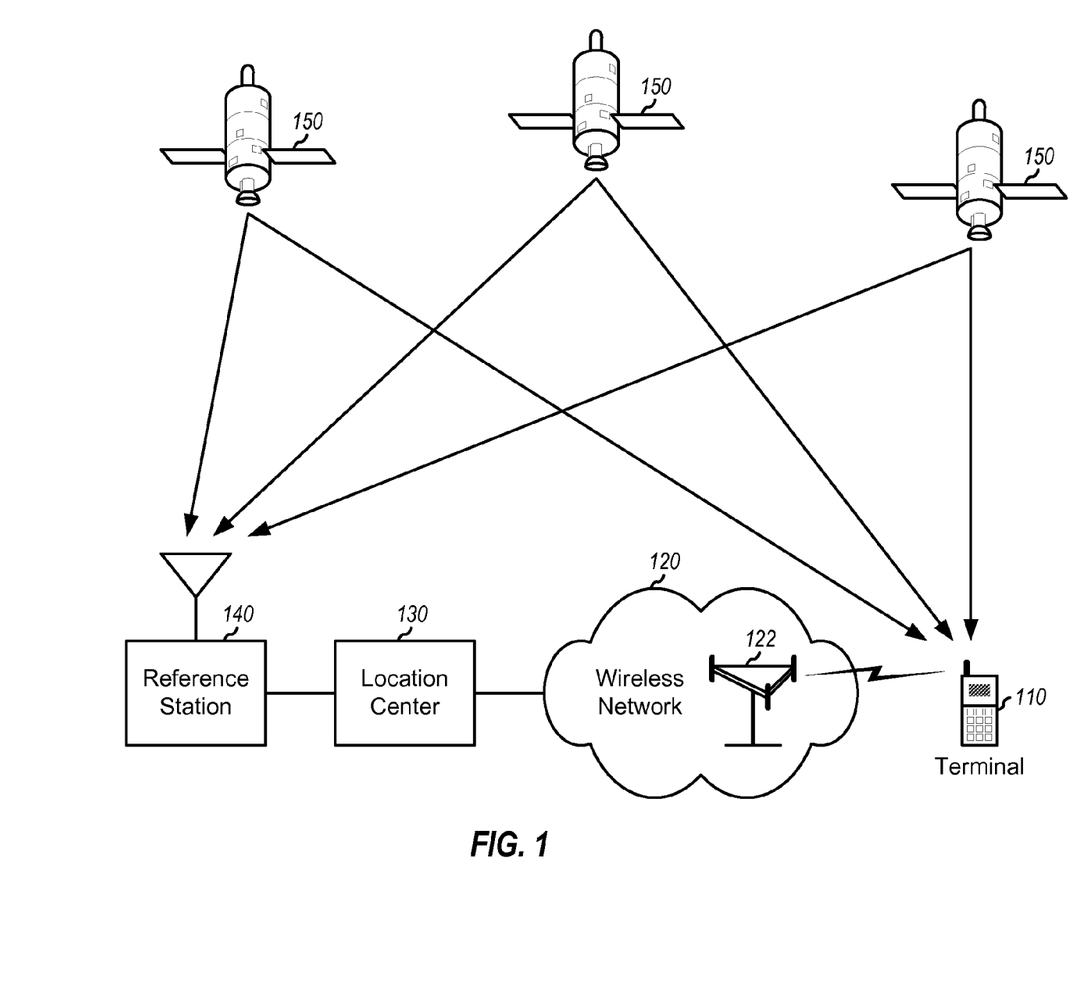
FIG. 1 illustrates an exemplary deployment supporting positioning.

FIG. 1 shows an exemplary deployment supporting positioning and location services. A terminal 110 may communicate with a base station 122 in a wireless network 120 to obtain communication services. Terminal 110 may be stationary or mobile and may also be referred to as a mobile station (MS), a user equipment (UE), an access terminal (AT), a subscriber station, a station (STA), etc. Terminal 110 may be a cellular phone, a personal digital assistant (PDA), a handheld device, a wireless device, a laptop computer, a wireless modem, a cordless phone, a telemetry device, a tracking device, etc.

Base station 122 may support radio communication for terminals within its coverage and may also be referred to as a Node B, an evolved Node B (eNB), an access point, a femtocell, etc. Wireless network 120 may be a Code Division Multiple Access (CDMA) 1X network, a High Rate Packet Data (HRPD) network, a Wideband CDMA (WCDMA) network, a Global System for Mobile Communications (GSM) network, a General Packet Radio Service (GPRS) network, a Long Term Evolution (LTE) network, or some other wireless network. GSM, WCDMA and GPRS are part of Universal Mobile Telecommunications System (UMTS). LTE is part of Evolved Packet System (EPS). CDMA 1X and HRPD are part of cdma2000. GSM, WCDMA, GPRS and LTE are described in documents from an organization named "3rd Generation Partnership Project" (3GPP). CDMA 1X and HRPD are described in documents from an organization named "3rd Generation Partnership Project 2" (3GPP2). Wireless network 120 may also be a wireless local area network (WLAN) or a wireless personal area network (WPAN), for example.

Terminal 110 may receive and measure signals from satellites 150 to obtain pseudo-ranges for the satellites. The satellites may be part of the United States Global Positioning System (GPS), the European Galileo system, the Russian GLONASS system, the Japanese Quasi-Zenith Satellite System (QZSS), the Chinese Compass/Beidou system, the Indian Regional Navigational Satellite System (IRNSS), some other satellite positioning system (SPS), or a combination of these systems. The pseudo-ranges and the known locations of the satellites may be used to derive a location estimate for terminal 110. A location estimate may also be referred to as a position estimate, a position fix, etc. Terminal 110 may also receive and measure signals from base stations within wireless network 120 to obtain timing and/or signal strength measurements for the base stations. The timing and/or signal strength measurements and the known locations of the base stations may be used to derive a location estimate for terminal 110. In general, a location estimate may be derived based on measurements for satellites, base stations, pseudolites, and/or other transmitters and using one or a combination of positioning methods.

A location center 130 may communicate with wireless network 120 to support positioning and location services for terminals. Location services may include any services based on or related to location information. Positioning is a process to determine a geographic or civil location estimate for a terminal Positioning may provide (i) latitude, longitude, and possibly altitude coordinates and an uncertainty for a geographic location estimate or (ii) a street address for a civil location estimate. Positioning may also provide velocity and/or other information. Location center 130 may be a Secure User Plane Location (SUPL) Location Platform (SLP), a Mobile Positioning Center (MPC), a Gateway Mobile Location Center (GMLC), etc.

A reference station 140 may receive and measure signals from satellites 150 and may determine pseudo-ranges for the satellites based on the signal measurements. Reference station 140 may also compute the ranges for the satellites based on known location of the reference station and known locations of the satellites, which may be obtained via ephemeris data sent by the satellites. Reference station 140 may determine a pseudo-range correction for each satellite based on the difference between the measured pseudo-range and the computed range for that satellite. Reference station 140 may also determine a UDRE for each satellite based on various factors such as errors associated with receiver hardware at the reference station, surveying errors in the known location of the reference station, etc. The UDRE for each satellite may be an estimate of an uncertainty in the pseudo-range correction for that satellite. For example, a computed pseudo-range correction of x and a UDRE value of y may indicate that there is a 68% probability (for one-sigma) that the actual pseudo-range correction is within a range of x−y to x+y. The UDRE may be provided as an error component to an algorithm used to compute a location estimate. Reference station 140 may determine differential corrections for the satellites, which may comprise pseudo-range corrections, UDREs, and other quantities described below. Reference station 140 may transmit (e.g., broadcast) the differential corrections to support differential GNSS (DGNSS). Alternatively or additionally, reference station 140 may send the differential corrections to location center 130 and/or wireless network 120, which may send the differential corrections to the terminals.

Terminal 110 may use the differential corrections to improve positioning. For example, terminal 110 may assume that the signals received by terminal 110 from satellites 150 will have similar errors as the signals received by reference station 140 from the same satellites 150. Terminal 110 may thus correct the pseudo-range computed by terminal 110 for each satellite by the pseudo-range correction computed by reference station 140 for that satellite. A location estimate for terminal 110 may be computed based on corrected pseudo-ranges for a sufficient number of satellites, e.g., four or more satellites. The UDRE for each satellite may be used to determine an uncertainty in the location estimate for terminal 110.

In an aspect, differential correction for a satellite in a GNSS (which may also be referred to as DGNSS correction) may include a UDRE as well as a UDRE growth rate and a time of validity to help the terminals better utilize the DGNSS correction. A corrected UDRE may be derived based on the UDRE, the UDRE growth rate, and the time of validity. The corrected UDRE (instead of the original UDRE) may be used to derive a location estimate.

In one design, a corrected UDRE for a satellite may be determined as follows:

$$\text{Corrected\_UDRE} = \left(\frac{\text{cur\_time} - \text{ref\_time}}{\text{time\_of\_validity}} * (\text{UDRE\_growth\_rate} - 1) + 1\right) * UDRE, \quad \text{Eq (1)}$$

where cur_time is the current time,
 ref_time is a reference time for which the DGNSS correction is valid,
 UDRE_growth_rate is the UDRE growth rate,
 time_of_validity is the time of validity for the UDRE growth rate, and corrected UDRE is a corrected UDRE that takes into account the UDRE growth rate and the time of validity.

In the design shown in equation (1), the UDRE growth rate may indicate how much to scale the UDRE in a given time unit to obtain the corrected UDRE. The time of validity may indicate the time unit used to apply the UDRE growth rate. Equation (1) assumes that the UDRE degrades linearly over time. Hence, the amount of degradation may be given by two factors, which are the UDRE growth rate and the time of validity. These two factors may be used to linearly interpolate the amount of degradation at any given time instant. The amount of degradation may also be modeled in other manners, e.g., by a parabolic function or some other interpolation function. Other factors instead of or in addition to the UDRE growth rate and the time of validity may also be used to determine the amount of degradation with the interpolation function selected for use.

In another design, the time of validity may indicate the time duration over which the UDRE growth rate is valid. In this design, the corrected UDRE may be computed as shown in equation (1), albeit with a predetermined value for the time_of_validity. If the current time is later than the reference time by the time of validity, then the UDRE growth rate may be deemed as invalid. The time of validity may also be defined in other manners. For clarity, the following description assumes the time of validity defined as shown in equation (1).

In one design, DGNSS corrections for satellites may be provided via a pair of request and response messages. A request message may be sent to request for DGNSS corrections. A response message may be returned to provide the requested DGNSS corrections. Different request and response messages may be defined for different positioning protocols that support positioning of terminals. These positioning protocols may include (i) Radio Resource LCS Protocol (RRLP) and Radio Resource Control (RRC) defined by 3GPP and (ii) C.S0022 (which is also known as IS-801) defined by 3GPP2. RRLP and RRC support positioning of terminal in 3GPP networks, e.g., GSM and WCDMA networks. IS-801 supports positioning of terminals in 3GPP2 networks, e.g., CDMA 1X and HRPD networks.

Figure 2:
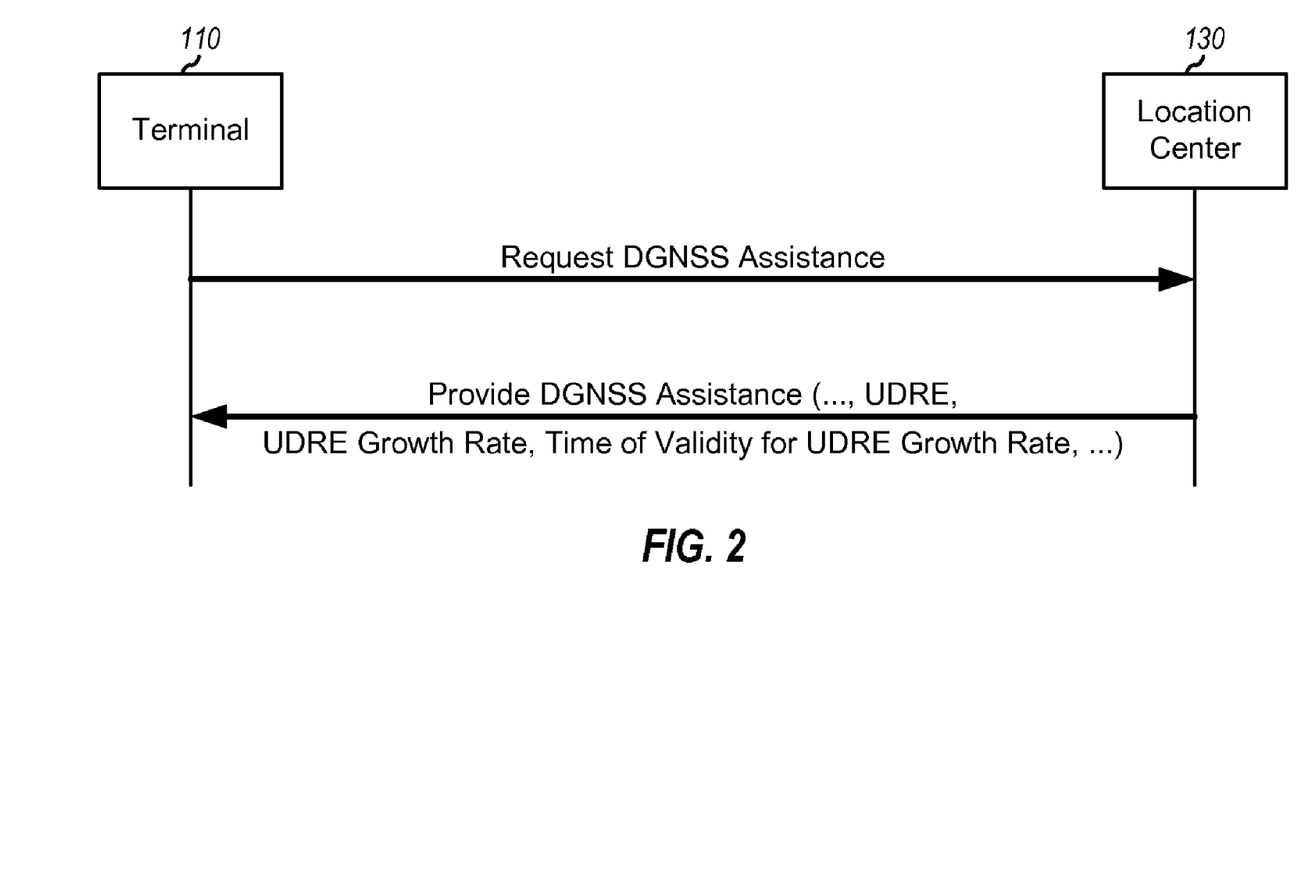
FIG. 2 illustrates a request message and a provide messages for differential corrections.

FIG. 2 illustrates a pair of request and provide messages for DGNSS corrections in IS-801. Terminal 110 may send a Request DGNSS Assistance message to location center 130 to request for assistance data for DGNSS. Location center 130 may return a Provide DGNSS Assistance message carrying the requested DGNSS assistance data, which may include DGNSS corrections. Terminal 110 may use the DGNSS corrections for positioning.

Figure 3:
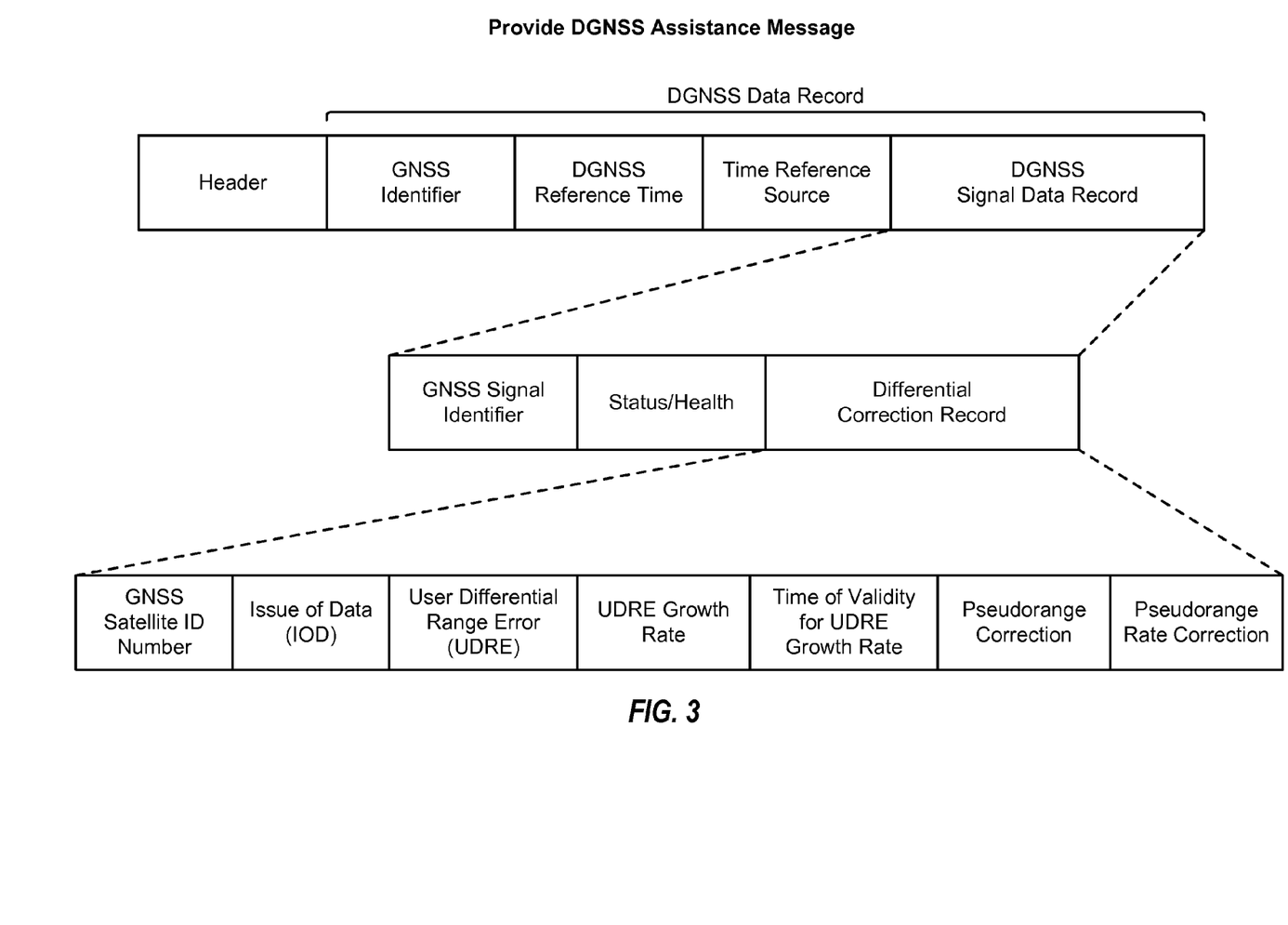
FIG. 3 illustrates a Provide DGNSS Assistance message.

FIG. 3 illustrates a design of the Provide DGNSS Assistance message, which may be used to send DGNSS corrections in IS-801. DGNSS assistance data may be partitioned into K parts, where K may be a value within a range of 1 to 16 for example. Each part of the DGNSS assistance data may be sent in a different instance of the Provide DGNSS Assistance message.

Table 1 illustrates a design of the Provide DGNSS Assistance message shown in FIG. 3. In the first column of Table 1, symbol ">" indicates a field of the message, symbol ">>" indicates a subfield of a field, and symbol ">>>" indicates a parameter or element of a subfield. In the fourth (Presence) column of Table 1, "M" indicates a mandatory parameter, and "O" indicates an optional parameter. In Table 1, the term "base station" generically refers to a network entity responsible for performing the action described in the table.

TABLE 1

Provide DGNSS Assistance Message

| Information Element Name | Type | Multi | Presence | Description |
|---|---|---|---|---|
| Part number | Integer (1 ... 16) | | M | The base station shall set this field to specify the part number of the DGNSS Assistance data, in the range from 1 to "Total number of parts". |
| Total number of parts | Integer (1 ... 16) | | M | The base station shall set this field to specify the total number of parts that the DGNSS Assistance data is divided into, in the range from 1 to 16. |
| DGNSS Data record | | 1 ... <maxNUM_GNSS> | M | The value of maxNUM_GNSS is 16. |
| >GNSS identifier | Integer (1 ... 16) | | M | The base station shall set this field to identify the GNSS for which the DGNSS assistance is included in this DGNSS Data record element. The mapping of the "GNSS identifier" value to GNSS is given in C.S0022. |
| >DGNSS reference time | Integer (0 ... 604799) | | M | This field identifies the reference time for which the DGNSS corrections are valid, modulo 1 week in 1 second unit. The base station shall set this field in units of seconds in the range from 0 sec to 604,799 sec in GNSS (identified by "GNSS identifier") specific system time. |
| >Time reference source | Integer (0 ... 15) | | O | The base station shall set this field according to C.S0022 to indicate the type of time reference used for the "DGNSS Reference time". This field is optional. If this field is absent, the "Time reference source" is the CDMA time reference. |
| >DGNSS signal data record | | 1 to <maxNUM_SIG> | M | The value of maxNUM_SIG is 8. |
| >>GNSS signal identifier | Integer (1 ... 8) | | O | The base station shall set this field to identify the GNSS signal for the GNSS as identified by "GNSS identifier" for which the DGNSS assistance is included in this "DGNSS signal data record" as specified in C.S0022. This element is optional. If this element is absent, the base station includes DGNSS assistance for the signal corresponding to the integer value '1' defined in C.S0022 of the particular GNSS identified by "GNSS identifier". |
| >>Status/Health | Integer (0 ... 7) | | M | This field indicates the status of the differential corrections contained in this "DGNSS signal data record". The base station shall set this field to the values in accordance with UDRE Scale factor, validity or availability of corrections, as given in C.S0022. |
| >>Differential correction record | | 1 to <N_SAT> | O | The value of N_SAT is 16. This Correction record is optional. If the value of "Status/Health" field is either '6' or '7', the base station shall omit this field. |
| >>>GNSS satellite ID number | Integer (0 ... 63) | | M | The base station shall set this field to the value of the satellite ID number of the GNSS identified by "GNSS identifier" for which the Correction record is valid, as specified in C.S0022. |
| >>>Issue of data (IOD) | Bit String (11) | | M | This field identifies the ephemeris for which the pseudorange corrections are applicable. The definition of this field depends on the value of the "GNSS identifier" field and is given in C.S0022. |

TABLE 1-continued

Provide DGNSS Assistance Message

| Information Element Name | Type | Multi | Presence | Description |
|---|---|---|---|---|
| >>>User differential range error (UDRE) | Integer (0 ... 3) | | M | This field provides an estimate of the uncertainty (1-σ) in the corrections for the particular satellite. The base station shall set this field to the value in accordance with the user differential range error (UDRE) as given in C.S0022. The value in the UDRE field shall be multiplied by the UDRE Scale Factor in the "Status/Health" field to determine the final UDRE estimate for the particular satellite. |
| >>>UDRE Growth Rate | Integer (0 ... 7) | | O | This field provides an estimate of the growth rate of uncertainty (1-σ) in the corrections for the particular satellite. The base station shall set this field to the value in accordance with the UDRE Growth Rate as given in Table 2 below. The UDRE at time value specified in the "Time of Validity for UDRE Growth Rate" field is the value of this field times the value of the UDRE field. |
| >>>Time of Validity for UDRE Growth Rate | Integer (0 ... 7) | | O | This field specifies the time when the above "UDRE Growth Rate" field applies. The base station shall set this field to the value in accordance with the Time of Validity for UDRE Growth Rate as given in Table 3 below. |
| >>> Pseudorange correction | Integer (−2047 ... 2047) | | M | Scale factor: 0.32 m. The base station shall set this field to the pseudorange correction with respect to GNSS specific geodetic datum (e.g., PZ-90.02 if "GNSS identifier" indicates GLONASS) at the "DGNSS reference time" $t_0$, in the range from −655.04 to 655.04 m. The method for calculating this field is given in [1]. |
| >>>Pseudorange rate correction | Integer (−127 ... 127) | | M | Scale factor: 0.032 meters/sec. The base station shall set this field to the Pseudo-range rate corrections with respect to GNSS specific geodetic datum (e.g., PZ-90.02 if "GNSS identifier" indicates GLONASS), in the range from −4.064 to 4.064 meters/sec. For some time $t_1 > t_0$, the corrections for IOD are estimated by: $PRC(t_{1,IOD}) = PRC(t_{0,IOD}) + RRC(t_{0,IOD}) \times (t_1 - t_0)$, and the mobile station uses this to correct the pseudorange it measures at $t_1$, $PR_m(t_{1,IOD})$, by: $PR(t_{1,IOD}) = PR_m(t_{1,IOD}) + PRC(t_{1,IOD})$ |

[1] Radio Technical Commission for Maritime Services (RTCM)-SC104, RTCM Recommended Standards for Differential GNSS Service.

In the design shown in FIG. 3 and Table 1, the Provide DGNSS Assistance message includes a header and a DGNSS data record. The header includes (i) a Part number field indicating which part of the DGNSS assistance data is being sent in the message and (ii) a Total number of parts field indicating the total number of parts (K) of the DGNSS assistance data.

The DGNSS data record includes (i) a GNSS identifier field indicating a GNSS (e.g., GPS, Galileo, GLONASS, etc.) for which assistance data is being provided, (ii) a DGNSS reference time field indicating a reference time for which the DGNSS corrections are valid, (iii) a Time reference source field indicating the type of time reference (e.g., terminal time reference, GPS reference, etc.) used for the DGNSS reference time, and (iv) a DGNSS signal data record including one or more signal records for one or more GNSS signals. Each satellite may transmit different signals at different frequencies. For example, a GPS satellite may transmit L1 C/A, L1C, L2C, and L5 signals. One signal record may be included in the message for each GNSS signal. For simplicity, FIG. 3 shows a single signal record for a single GNSS signal.

The signal record for each GNSS signal includes (i) a GNSS signal identifier field indicating the GNSS signal for which DGNSS corrections are provided, (ii) a Status/health field indicating a scaling factor to apply to the UDRE provided for the GNSS signal, and (iii) a Differential correction record including one or more satellite records for one or more satellites transmitting the GNSS signal.

The satellite record for each satellite includes (i) a GNSS satellite ID number field indicating the satellite, (ii) an Issue of data (IOD) field indicating the ephemeris data for which the pseudo-range corrections are applicable, (iii) a UDRE field carrying a UDRE for the satellite, (iv) a UDRE growth rate field carrying a UDRE growth rate for the satellite, (v) a Time of validity for UDRE growth rate field carrying a time unit used to apply the UDRE growth rate for the satellite, (vi) a Pseudo-range correction field carrying a pseudo-range correction for the satellite, and (vii) a Pseudo-range rate correction field carrying a pseudo-range rate correction for the satellite.

The various records, fields, elements, and parameters of the Provide DGNSS Assistance message are described in 3GPP2 C.S0022-B, entitled "Position Determination Service for cdma2000 Spread Spectrum Systems," Version 1.0, dated Apr. 17, 2009, and publicly available. The Provide DGNSS Assistance message may also include different, fewer, or more records, fields, elements, and parameters.

Table 2 shows a set of possible values for the UDRE growth rate for a satellite, in accordance with one design. The indication in the second column of Table 2 may be used for the UDRE_growth_rate parameter in equation (1).

TABLE 2

UDRE Growth Rate

| Value | Indication |
|---|---|
| '0' | 1.5 |
| '1' | 2 |
| '2' | 4 |
| '3' | 6 |
| '4' | 8 |
| '5' | 10 |
| '6' | 12 |
| '7' | 16 |

Table 3 shows a set of possible values for the time of validity for UDRE growth rate for a satellite, in accordance with one design. The indication in the second column of Table 3 may be used for the time_of_validity parameter in equation (1).

TABLE 3

Time of Validity for UDRE Growth Rate

| Value | Indication (in sec) |
|---|---|
| '0' | 30 |
| '1' | 60 |
| '2' | 120 |
| '3' | 240 |
| '4' | 480 |
| '5' | 960 |
| '6' | 1920 |
| '7' | 3840 |

Tables 2 and 3 show specific designs of the UDRE growth rate and the time of validity for UDRE growth rate. These parameters may also be defined in other manners, e.g., with fewer or more possible values, with different indications for the possible values, etc.

The request/provide message pair for DGNSS corrections may enable differential correction capability for various GNSS systems (e.g., GPS, Galileo, GLONASS, etc.) in terminals. The DGNSS corrections may include the UDRE, the pseudo-range correction, and the pseudo-range rate correction. The DGNSS corrections may also include the UDRE growth rate and the time of validity for UDRE growth rate, which may help the terminals to use the DGNSS corrections correctly and efficiently. Without the UDRE growth rate and the time of validity for UDRE growth rate, the terminals may not know how long the DGNSS corrections are good for. Hence, a terminal may have to make certain assumption on the validity of the DGNSS corrections. There may be several drawbacks if the terminal makes a wrong assumption. For example, the terminal may guess that the DGNSS corrections are valid for a long time and may use the DGNSS corrections at a time that is too late, which may then result in excessive error in a location estimate for the terminal. Alternatively, the terminal may guess that the DGNSS corrections are valid for a short time and may frequently request for new DGNSS corrections, which may then result in unnecessary traffic. These drawbacks may be avoided by sending the UDRE growth rate and the time of validity for UDRE growth rate to the terminal Differential corrections have been used for GPS and are referred to as differential GPS (DGPS). Prior to the year 2000, pseudo-random errors were deliberately introduced in signals transmitted by GPS satellites via a process commonly referred to as selective availability (SA). DGPS corrections may be applied relatively rapidly (e.g., with a maximum of tens of seconds between updates) in order to combat SA. Errors corrected by DGPS were relatively high frequency in nature. Currently, RTCM, 3GPP and 3GPP2 do not indicate how long a differential correction is valid for, although this information may be readily extracted by location server 130 based on recent differential correction history. DGPS-enabled terminals typically have hard time-outs of 30 to 60 seconds and would stop using the DGPS corrections when a time-out occur. The hard time-outs may be applicable when SA was applied prior to 2000. However, with SA disabled in 2000, the error sources due to the atmosphere, ephemeris data errors, and clock drifts typically vary much more slowly.

The present disclosure exploits the relatively slow varying nature of the error sources for DGPS and conveys an expected rate of degradation of the differential corrections to the terminals to enable better usage of the differential corrections. The error sources may vary slowly but significantly for some GNSS systems. Information on the rate of degradation of the differential corrections for these GNSS systems may be useful to the terminals. The UDRE growth rate and the time of validity of UDRE growth rate described herein may allow a positioning protocol to communicate the expected rate of degradation of the differential corrections and hence may allow the terminals to weight and/or time-out appropriately.

Figure 4:
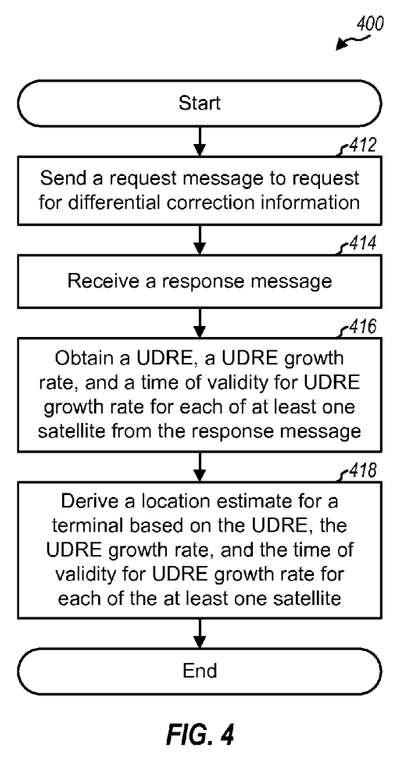
FIG. 4 illustrates a process for performing positioning.

FIG. 4 shows a design of a process 400 for performing positioning. Process 400 may be performed by a terminal, a location center, or some other entity. A request message may be sent to request for differential correction information (block 412). A response message comprising the differential correction information may be received (block 414). The request and response messages may be for IS-801, RRLP, RRC, or some other positioning protocol.

A UDRE, a UDRE growth rate, and a time of validity for UDRE growth rate for each of at least one satellite may be obtained from the response message (block 416). The at least one satellite may be for GPS, Galileo, GLONASS, QZSS, Compass/Beidou, or some other satellite positioning system (SPS). A location estimate for a terminal may be derived based on the UDRE, the UDRE growth rate, and the time of validity for UDRE growth rate for each of the at least one satellite (block 418).

In one design, the UDRE growth rate for each satellite may indicate a scaling factor for the UDRE for the satellite. The time of validity for UDRE growth rate for each satellite may indicate a time unit used to apply the scaling factor for the satellite. A corrected UDRE for each satellite may be derived based on the UDRE, the UDRE growth rate, and the time of validity for UDRE growth rate for the satellite, e.g., as shown in equation (1). The location estimate for the terminal may be derived based on the corrected UDRE for each satellite.

In one design, a pseudo-range correction and a pseudo-range rate correction for each satellite may also be obtained from the response message. A pseudo-range for each satellite may be determined based on a signal received from the satellite. A corrected pseudo-range for each satellite may be determined based on the pseudo-range, the pseudo-range correction, and the pseudo-range rate correction for the satellite, e.g., based on an equation that may be similar to equation (1). The location estimate for the terminal may be derived based further on the corrected pseudo-range for each satellite.

Figure 5:
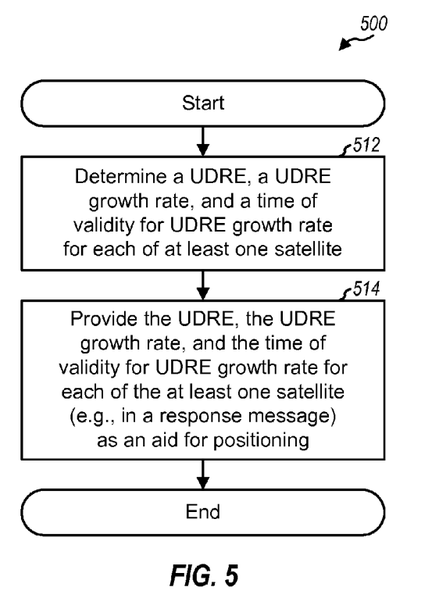
FIG. 5 illustrates a process for supporting positioning.

FIG. 5 shows a design of a process 500 for supporting positioning. Process 500 may be performed by a location center, a base station, a reference station, or some other entity. A UDRE, a UDRE growth rate, and a time of validity for UDRE growth rate may be determined for each of at least one satellite (block 512). The UDRE, the UDRE growth rate, and the time of validity for UDRE growth rate for each of the at least one satellite may be provided as an aid for positioning (block 514). In one design of block 514, a request message for differential correction information may be received. A response message comprising the UDRE, the UDRE growth rate, and the time of validity for UDRE growth for each satellite may be sent.

In one design, a pseudo-range for each satellite may be determined at a station, e.g., a reference station. A range for each satellite may be computed based on the known location of the satellite (which may be determined based on ephemeris data for the satellite) and the known location of the station. A pseudo-range correction for each satellite may be determined based on the pseudo-range and the range for the satellite. The pseudo-range correction and a pseudo-range rate correction for each satellite may also be provided as an aid for positioning.

Figure 6:
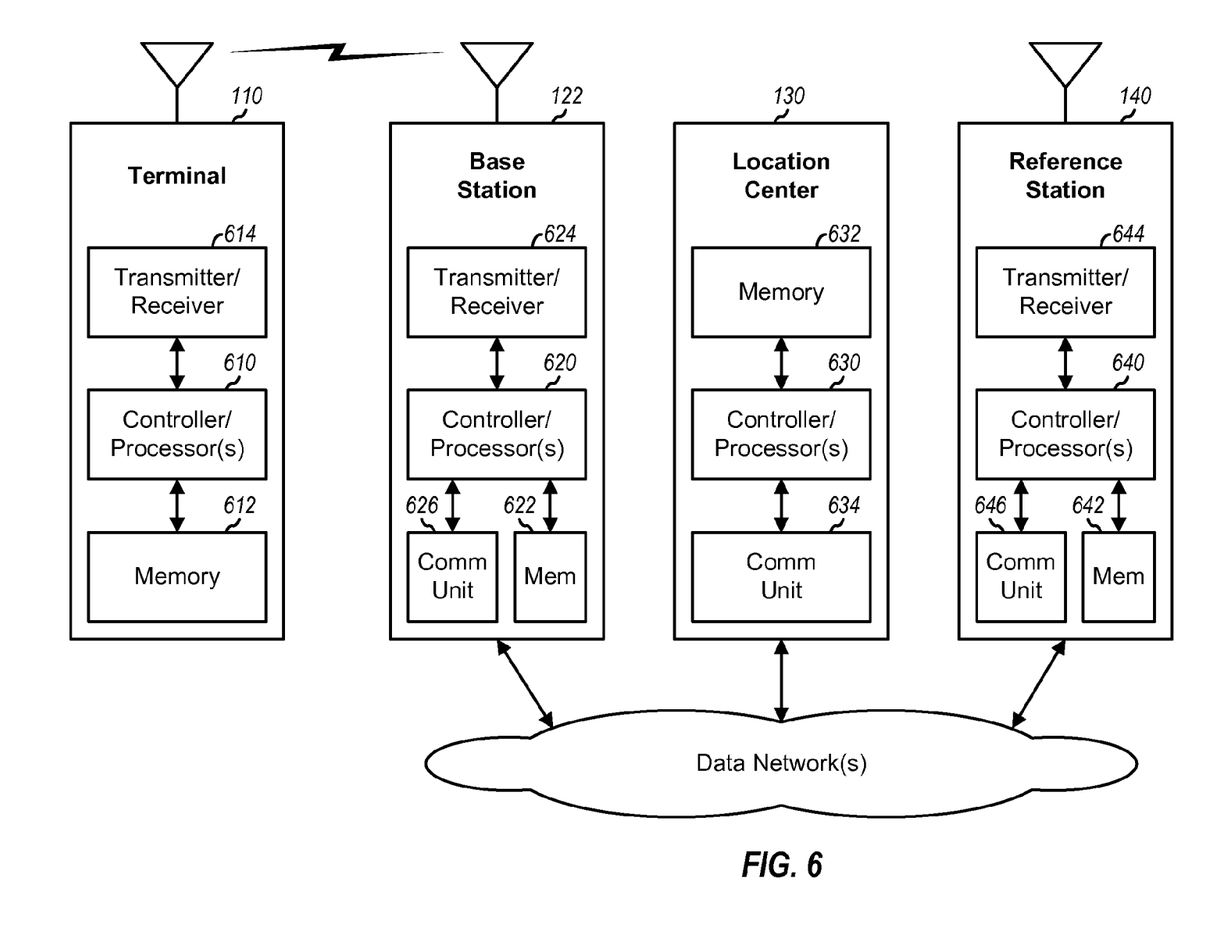
FIG. 6 illustrates a block diagram of a terminal and other network entities.

FIG. 6 shows a block diagram of a design of terminal 110, base station 122, location server 130, and reference station 140 in FIG. 1. For simplicity, FIG. 6 shows one or more controllers/processors 610, one memory 612, and one transmitter/receiver 614 for terminal 110, one or more controllers/processors 620, one memory (Mem) 622, one transmitter/receiver 624, and one communication (Comm) unit 626 for base station 122, one or more controllers/processors 630, one memory 632, and one communication unit 634 for location center 130, and one or more controllers/processors 640, one memory 642, one transmitter/receiver 644, and one communication unit 646 for reference station 140. In general, each entity may include any number of processing units (processors, controllers, etc.), memories, transmitters, receivers, communication units, etc. Terminal 110 may support communication with one or more wireless and/or wireline networks. Terminal 110 and reference station 140 may receive and process signals from one or more GNSS, e.g., GPS, Galileo, GLONASS, etc.

On the downlink, base station 122 may transmit traffic data, signaling (e.g., response messages), and pilot to terminals within its coverage area. These various types of information may be processed by processor(s) 620, conditioned by transmitter 624, and transmitted on the downlink. At terminal 110, the downlink signal from base station 122 may be received and conditioned by receiver 614 and further processed by processor(s) 610 to obtain various types of information. Processor(s) 610 may perform process 400 in FIG. 4 and/or other processes for the techniques described herein. Memory 612 may store program codes and data for terminal 110. On the uplink, terminal 110 may transmit traffic data, signaling (e.g., request messages), and pilot to base station 122. These various types of information may be processed by processor(s) 610, conditioned by transmitter 614, and transmitted on the uplink. At base station 122, the uplink signal from terminal 110 may be received and conditioned by receiver 624 and further processed by processor(s) 620 to obtain various types of information from terminal 110. Memory 622 may store program codes and data for base station 122. Base station 122 may communicate with other network entities via communication unit 626.

Terminal 110 may also receive and process signals from satellites. The satellite signals may be received by receiver 614 and processed by processor(s) 610 to obtain pseudo-ranges for the satellites. Processor(s) 610 may also receive differential correction information for the satellites and may compute a location estimate for terminal 110 based on the pseudo-ranges and the differential correction information. Processor(s) 610 may also provide the pseudo-ranges and/or satellite measurements to location center 130, which may compute the location estimate for terminal 110.

Within location center 130, processor(s) 630 may perform processing to support positioning and location services for terminals. For example, processor(s) 630 may perform process 400 in FIG. 4, process 500 in FIG. 5, and/or other processes for the techniques described herein. Processor(s) 630 may also compute a location estimate for terminal 110, provide location information to LCS clients, etc. Memory 632 may store program codes and data for location center 130. Communication unit 634 may allow location center 130 to communicate with terminal 110 and/or other network entities.

Within reference station 140, processor(s) 640 may perform processing to support positioning for terminals. Satellite signals may be received by receiver 644 and processed by processor(s) 640 to obtain pseudo-ranges for the satellites. Processor(s) 640 may compute pseudo-range corrections, UDREs, and/or other corrections for the satellites. Processor (s) 640 may perform process 500 in FIG. 5 and/or other processes for the techniques described herein. Memory 642 may store program codes and data for reference station 140. Communication unit 646 may allow reference station 140 to communicate with terminal 110, satellite based augmentation systems (SBASs), and/or other network entities. Several independent but compatible SBASs exist and include the United States Wide Area Augmentation System (WAAS), the European Geostationary Navigation Overlay Service (EGNOS), the Japanese Multi-functional Satellite Augmentation System (MSAS), and the Indian GPS Aided GEO Augmented Navigation System (GAGAN). The (GPS-like) ranging signals from these SBASs may be considered as belonging to a single GNSS, even though this GNSS is not a standalone positioning system because of the small number of satellites and their distribution in space.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a controller, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processing unit, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processing unit such that the processing unit can read information from, and write information to, the storage medium. In the alternative, the storage medium may be integral to the processing unit. The processing unit and the storage medium may reside in an ASIC. The ASIC may reside in a user terminal In the alternative, the processing unit and the storage medium may reside as discrete components in a user terminal.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" may also include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above may also be considered a "mobile station."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. For example, an article of manufacture may comprise a computer program product. A computer program product may comprise a computer-readable medium. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer/processor (general-purpose or special-purpose); disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of performing positioning, comprising:
 obtaining a user differential range error (UDRE) and a UDRE growth rate for each of at least one satellite; and
 deriving a location estimate for a terminal based on the UDRE and the UDRE growth rate for each of the at least one satellite.

2. The method of claim 1, further comprising:
 obtaining a time of validity for UDRE growth rate for each of the at least one satellite, and wherein the location estimate is derived based further on the time of validity for UDRE growth rate for each satellite.

3. The method of claim 2, wherein the UDRE growth rate for each satellite indicates a scaling factor for the UDRE for the satellite, and wherein the time of validity for UDRE growth rate for each satellite indicates a time unit used to apply the scaling factor for the satellite.

4. The method of claim 2, wherein the deriving the location estimate comprises:
 determining a corrected UDRE for each of the at least one satellite based on the UDRE, the UDRE growth rate, and the time of validity for UDRE growth rate for the satellite, and
 deriving the location estimate based on the corrected UDRE for each satellite.

5. The method of claim 1, further comprising:
 obtaining a pseudo-range correction for each of the at least one satellite, and wherein the location estimate is derived based further on the pseudo-range correction for each satellite.

6. The method of claim 5, wherein the deriving the location estimate comprises:
 determining a pseudo-range for each of the at least one satellite,
 determining a corrected pseudo-range for each satellite based on the pseudo-range and the pseudo-range correction for the satellite, and
 deriving the location estimate based further on the corrected pseudo-range for each satellite.

7. The method of claim 1, further comprising:
 sending a request message to request for differential correction information; and
 receiving a response message comprising the UDRE and the UDRE growth rate for each of the at least one satellite.

8. The method of claim 7, wherein the request message and the response message are for IS-801, or Radio Resource LCS Protocol (RRLP), or Radio Resource Control (RRC).

9. The method of claim 1, wherein the at least one satellite belongs in Global Positioning System (GPS), Galileo system, GLONASS system, Quasi-Zenith Satellite System (QZSS), Compass/Beidou system, or a global navigation satellite system (GNSS).

10. An apparatus for performing positioning, comprising:
 means for obtaining a user differential range error (UDRE) and a UDRE growth rate for each of at least one satellite; and
 means for deriving a location estimate for a terminal based on the UDRE and the UDRE growth rate for each of the at least one satellite.

11. The apparatus of claim 10, further comprising:
 means for obtaining a time of validity for UDRE growth rate for each of the at least one satellite, and wherein the location estimate is derived based further on the time of validity for UDRE growth rate for each satellite.

12. The apparatus of claim 11, wherein the means for deriving the location estimate comprises:
 means for determining a corrected UDRE for each of the at least one satellite based on the UDRE, the UDRE growth rate, and the time of validity for UDRE growth rate for the satellite, and means for deriving the location estimate based on the corrected UDRE for each satellite.

13. The apparatus of claim 10, further comprising:
means for obtaining a pseudo-range correction for each of the at least one satellite, and wherein the location estimate is derived based further on the pseudo-range correction for each satellite.

14. The apparatus of claim 10, further comprising:
means for sending a request message to request for differential correction information; and
means for receiving a response message comprising the UDRE and the UDRE growth rate for each of the at least one satellite.

15. An apparatus for performing positioning, comprising:
at least one processing unit configured to obtain a user differential range error (UDRE) and a UDRE growth rate for each of at least one satellite, and to derive a location estimate for a terminal based on the UDRE and the UDRE growth rate for each of the at least one satellite.

16. The apparatus of claim 15, wherein the at least one processing unit is configured to obtain a time of validity for UDRE growth rate for each of the at least one satellite, and to derive the location estimate based further on the time of validity for UDRE growth rate for each satellite.

17. The apparatus of claim 16, wherein the at least one processing unit is configured to determine a corrected UDRE for each of the at least one satellite based on the UDRE, the UDRE growth rate, and the time of validity for UDRE growth rate for the satellite, and to derive the location estimate based on the corrected UDRE for each satellite.

18. The apparatus of claim 15, wherein the at least one processing unit is configured to obtain a pseudo-range correction for each of the at least one satellite, and to derive the location estimate based further on the pseudo-range correction for each satellite.

19. The apparatus of claim 15, wherein the at least one processing unit is configured to send a request message to request for differential correction information, and to receive a response message comprising the UDRE and the UDRE growth rate for each of the at least one satellite.

20. A non-transitory computer-readable medium comprising:
code to cause at least one computer to obtain a user differential range error (UDRE) and a UDRE growth rate for each of at least one satellite, and
code to cause the at least one computer to derive a location estimate for a terminal based on the UDRE and the UDRE growth rate for each of the at least one satellite.

21. A method of supporting positioning, comprising:
determining a user differential range error (UDRE) and a UDRE growth rate for each of at least one satellite; and
providing the UDRE and the UDRE growth rate for each of the at least one satellite as an aid for positioning.

22. The method of claim 21, further comprising:
providing a time of validity for UDRE growth rate for each of the at least one satellite as an aid for positioning.

23. The method of claim 21, further comprising:
determining a pseudo-range for each of the at least one satellite at a station;
computing a range for each satellite based on known location of the satellite and known location of the station;
determining a pseudo-range correction for each satellite based on the pseudo-range and the range for the satellite; and
providing the pseudo-range correction for each of the at least one satellite as an aid for positioning.

24. The method of claim 21, further comprising:
receiving a request message for differential correction information; and
sending a response message comprising the UDRE and the UDRE growth rate for each of the at least one satellite.

25. An apparatus for supporting positioning, comprising:
means for determining a user differential range error (UDRE) and a UDRE growth rate for each of at least one satellite; and
means for providing the UDRE and the UDRE growth rate for each of the at least one satellite as an aid for positioning.

26. The apparatus of claim 25, further comprising:
means for providing a time of validity for UDRE growth rate for each of the at least one satellite as an aid for positioning.

27. The apparatus of claim 25, further comprising:
means for determining a pseudo-range for each of the at least one satellite at a station;
means for computing a range for each satellite based on known location of the satellite and known location of the station;
means for determining a pseudo-range correction for each satellite based on the pseudo-range and the range for the satellite; and
means for providing the pseudo-range correction for each of the at least one satellite as an aid for positioning.

28. The apparatus of claim 25, further comprising:
means for receiving a request message for differential correction information; and
means for sending a response message comprising the UDRE and the UDRE growth rate for each of the at least one satellite.

* * * * *